United States Patent [19]

Scholes et al.

[11] 4,066,803

[45] Jan. 3, 1978

[54] METHOD FOR APPLYING LUBRICATING MATERIALS TO METALLIC SUBSTRATES

[75] Inventors: Addison B. Scholes, Muncie, Ind.; David L. Dollar, Greeneville, Tenn.; Robert L. Hurst, Muncie, Ind.

[73] Assignee: Ball Corporation, Muncie, Ind.

[21] Appl. No.: 751,690

[22] Filed: Dec. 17, 1976

Related U.S. Application Data

[63] Continuation of Ser. No. 570,345, April 22, 1975, abandoned.

[51] Int. Cl.$^2$ .................. B05D 5/08; B05D 1/04; B05D 1/06; B05D 7/14
[52] U.S. Cl. ......................... 427/26; 427/27; 427/32; 427/33
[58] Field of Search ............... 427/26, 27, 32, 33

[56] References Cited

U.S. PATENT DOCUMENTS

| | | | |
|---|---|---|---|
| 2,447,664 | 8/1948 | Pegg | 427/32 |
| 2,710,589 | 6/1955 | Brunner | 427/32 X |
| 2,764,508 | 9/1956 | Feick | 427/32 |
| 2,994,618 | 8/1961 | Landgraf | 427/32 |
| 3,713,873 | 11/1970 | Fish | 427/30 |
| 3,726,701 | 4/1973 | Nishikawa et al. | 427/32 |
| 3,914,461 | 10/1975 | Goodridge | 427/33 |

*Primary Examiner*—James R. Hoffman
*Attorney, Agent, or Firm*—Gilbert E. Alberding

[57] ABSTRACT

Method for generating and substantially uniformly electrostatically dispersing very finely divided spheroidally shaped lubricating particles onto the moving surface of metal or other electrically conducting substrate. A lubricant material in its liquid state is drawn by airflow through a small venturi orifice where it is sheared into droplets of various sizes. Larger droplets are filtered out of the continuing post-venturi airflow by gravity, baffles, airflow forces and/or inertia effects, leaving only a mist cloud of extremely small spheroid particles which are then migrated within a charged plasma so as to transfer electrical charge thereto in sufficient quantities to achieve a desired uniform high charge/mass ratio and thus insure a uniform eventual electrostatic dispersion of substantially all the spheroids over the substrate surface. The mist cloud is controllably generated for each of a plurality of longitudinal sections of the substrate and permitted to drift or migrate relatively slowly between transversely positioned electrodes and the conducting substrate spaced therefrom in respectively corresponding longitudinally partitioned sections of a non-conducting enclosure. A corona discharge is maintained by a voltage differential between the electrodes and the substrate to form an electrically charged plasma within the non-conducting enclosure which, in turn, multiply bombards and charges the individual particles of the slowly migrating mist cloud. Thusly charged to uniform charged states, the particles are then uniformly dispersed substantially only by electrostatic forces onto the surface of the longitudinally moving substrate.

18 Claims, 11 Drawing Figures

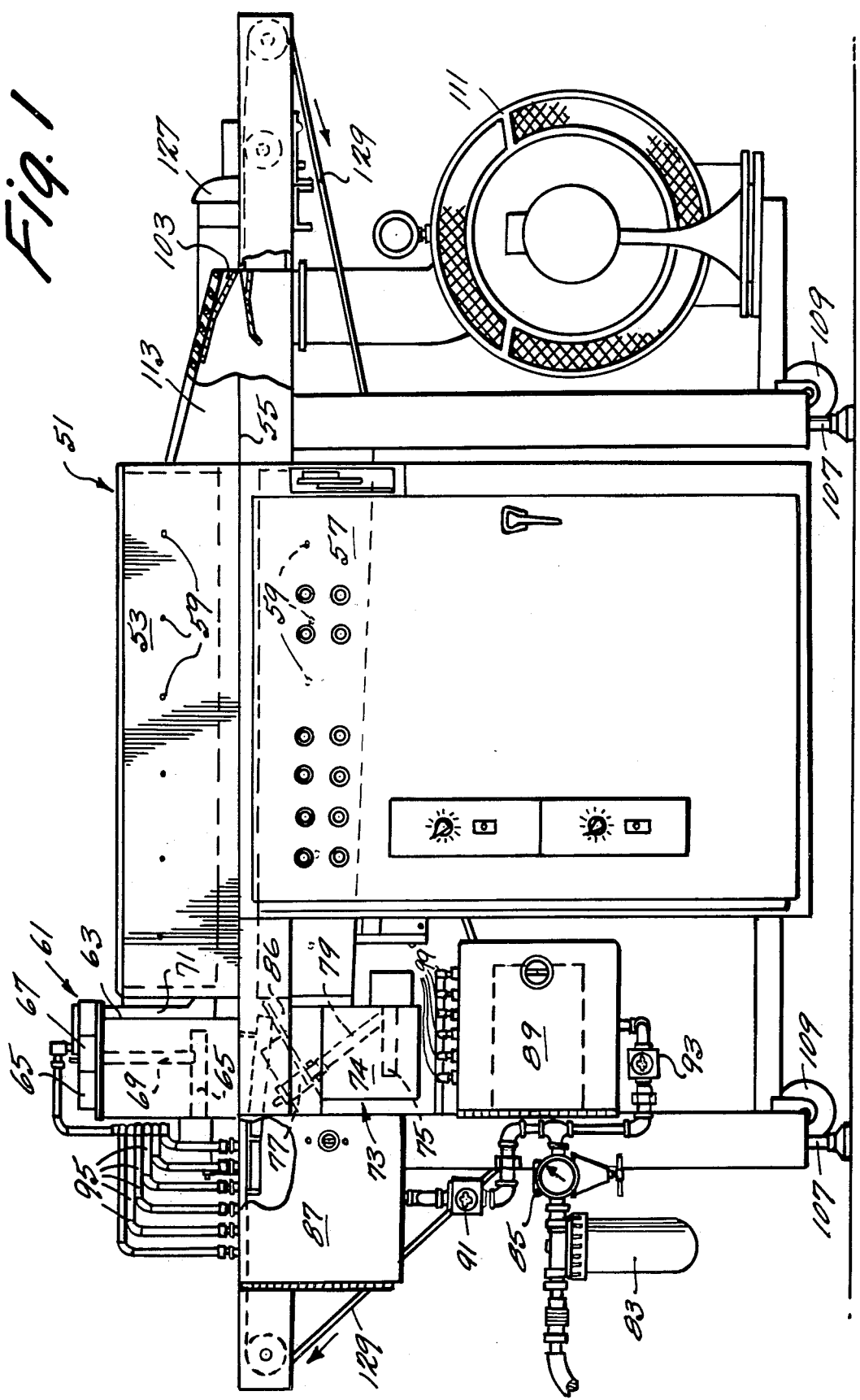

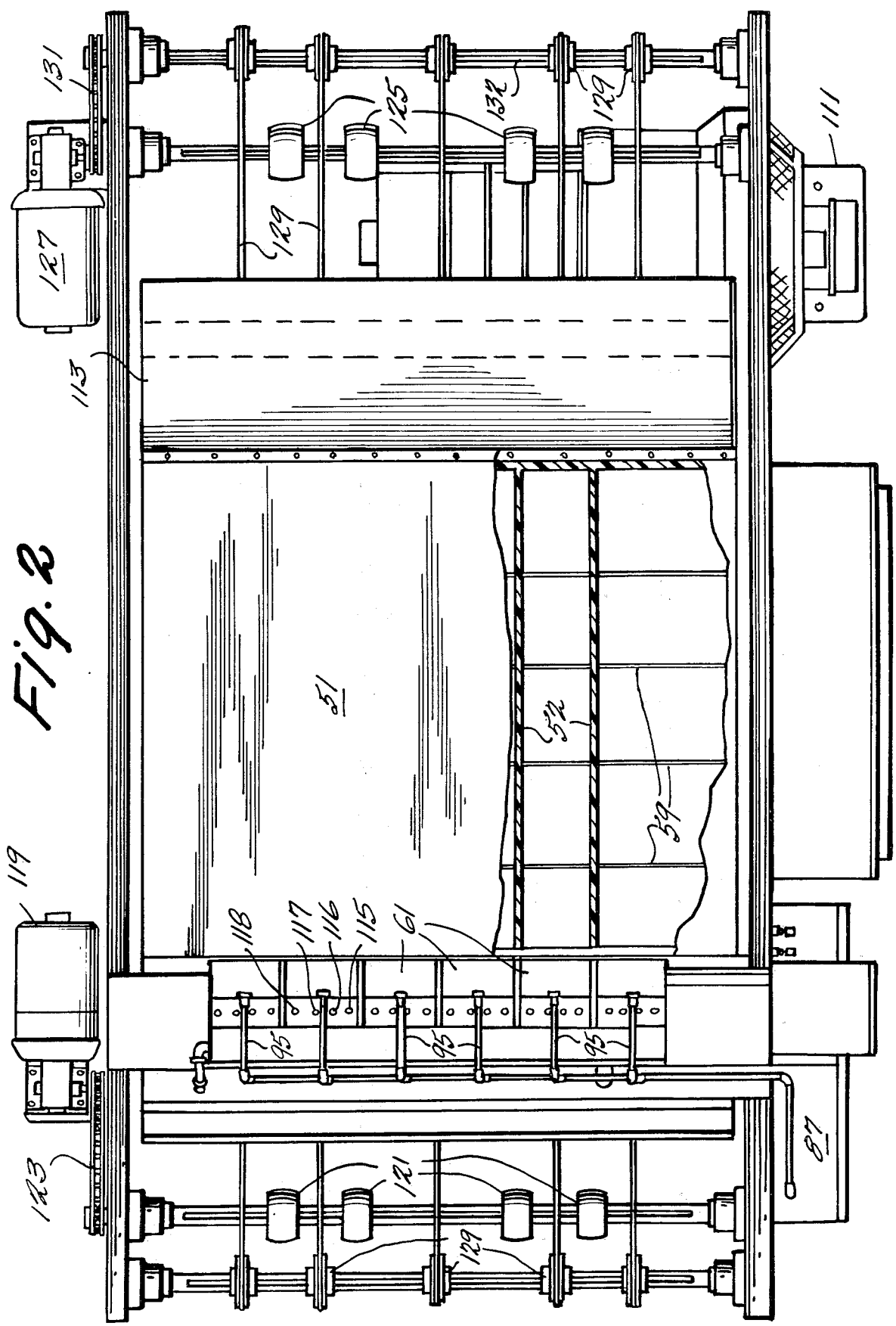

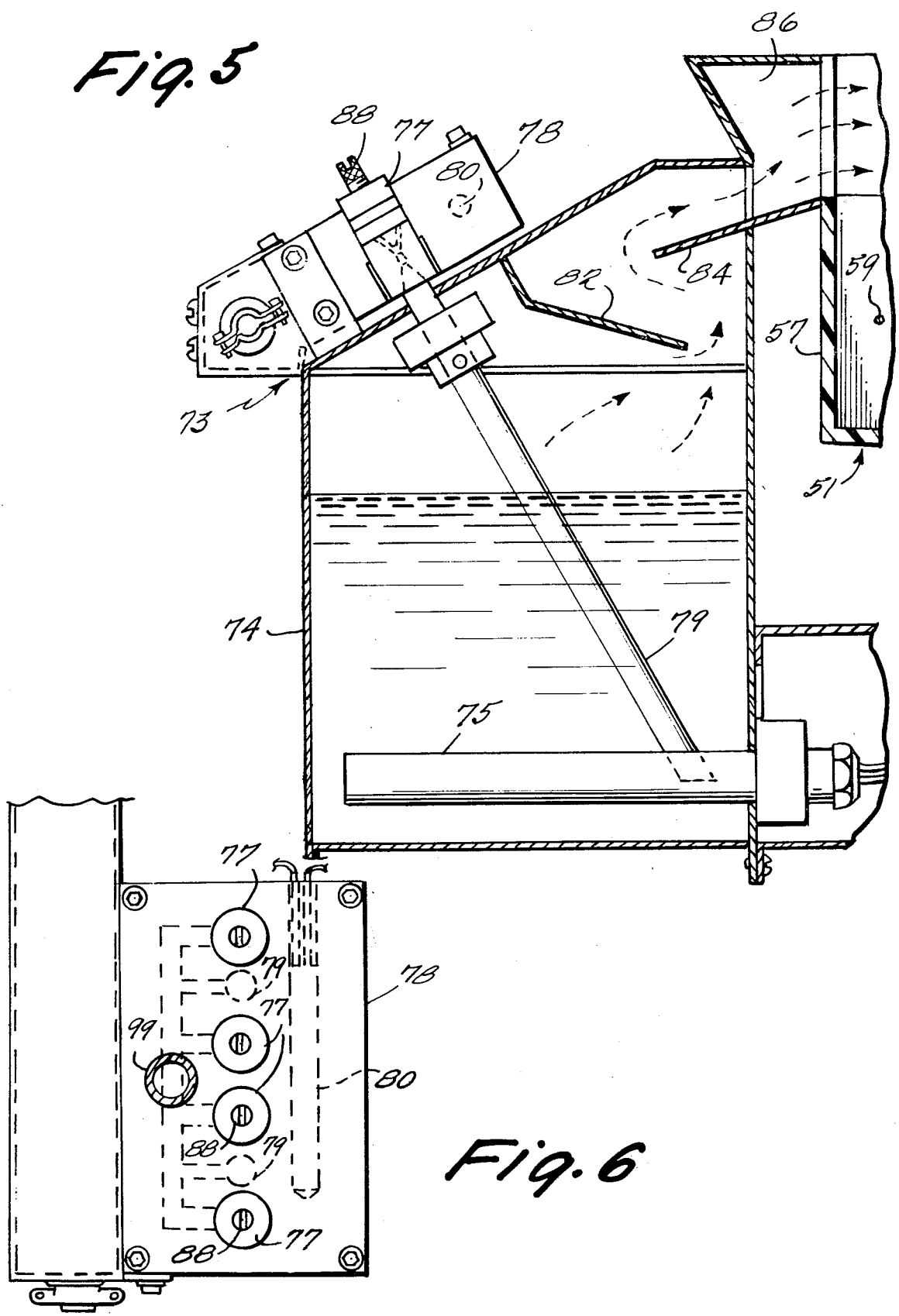

METHOD FOR APPLYING LUBRICATING MATERIALS TO METALLIC SUBSTRATES

This is a continuation, of application Ser. No. 570,345 filed Apr. 22, 1975 - now abandoned.

This application is related to the commonly assigned copending application Ser. No. 751,691 of Messrs. Addison B. Scholes and David L. Dollar filed concurrently herewith. Some of the disclosure presented hereinbelow for the purpose of fully describing our presently preferred embodiment and mode of operation represents the inventive contributions of Messrs. Scholes and Dollar and is accordingly claimed in said concurrently filed application.

This invention relates to a novel method for electrostatically uniformly dispersing tiny spheroids of a lubricating material onto a conducting substrate.

In the production of metal cans and other articles of manufacture, it is often necessary to provide slight amounts of lubrication material upon the surface of metal stock (e.g. sheets, strips, etc.) before storing the metal, subjecting the metal stock to further forming operations, such as passing the stock through various forming dies or for other reasons. Failure to apply lubrication prior to such forming operations results in severe scraping and galling of the dies, rendering them useless for continued service. In addition, failure to apply lubrication often results in deformed and defective finished articles for other reasons as known in the art. Also, as metallic surfaces are often processed with suitable ornamental effects, it is frequently desirable to provide the decorated metallic surface with lubrication immediately following the surface decorating process. Here again lubrication is required to enable the manufacturer to pass the decorated sheet or material through forming dies to punch and form the material without galling the dies or causing defective materials to be produced, etc. In all cases it is necessary to apply a fairly controlled amount of lubrication and to attempt to uniformly distribute it on the metal surfaces since excessive and/or uneven lubrication can and often does give rise to its own attendant problems as is also well known in the art. For instance, excessive wax lubrication not only wastes materials, it may accumulate on forming die surfaces and/or tend to "tack" or "weld" lubricated stock together upon mutual contact.

In the past the most conventional method of applying lubrication upon common metallic surface in the form of flat sheets, strips, etc., was simply to pass the material through a solvent bath saturated with organic lubricating compositions. Upon emerging from the bath, the solvent is permitted to evaporate thus leaving the organic lubricating composition as a thin film upon the metallic surface. Major disadvantages of this conventional procedure are the apparent hazardous and often toxic situations due to solvent fumes in the vicinity of such an operation as well as the considerable expense of supplying large quantities of solvent material, preparing and applying the solvent solution, as well as other related disadvantages as known in the art.

Accordingly, there have been repeated attempts to improve on the conventional solvent bath technique. However, for a great variety of reasons, such attempts have heretofore met with eventual failure when put to the practical test of actual operating conditions with the result that lubrication of such metal substrates today is still primarily achieved via the costly and hazardous solvent bath technique and/or with other less costly or less hazardous attempts which usually fail to provide the desired lubrication application.

Now, with the discovery of this invention, it is possible to achieve a form of lubricated metal substrate not heretofor possible through method and apparatus which is cheap and inherently safe over the solvent bath technique while at the same time providing superior lubrication results. Cleaner die surfaces are maintained, less lubrication material per unit area is required and the tack or weld or weld tendency of lubricated stock is reduced.

One prior approach to lubricating metallic surfaces involved the simple passing of the stock metal material under a bank of nozzles spraying lubricant directly upon the metal surfaces. However, such a direct spray process provides an excessively thick lubricating film which is typically non-uniform, thereby causing a great number of attendant problems as is recognized in the art.

A great number of prior attempts have been made to harness electrostatic deposition techniques for applying the necessary lubricant to the metal substrate. However, none of these prior attempts is believed to have been very successful. Some metal manufacturing facilities are known to have made costly investments in electrostatic apparatus purportedly designed for the purpose of applying lubrication to metal substrates only to abandon same in favor of the more conventional solvent bath or direct spraying techniques and/or to conclude that the "electrostatic" lubricator appeared to work about as well with the electrostatics turned off as when the electrostatics was turned on.

Evaluating the known prior electrostatic lubricator attempts in light of our present discoveries it appears that such prior attempts have failed to properly consider the detailed physical and electrical processes being attempted and have thus failed to properly provide suitable method and apparatus capable of fully facilitating same.

Of course, as is well known, the general object of electrostatic deposition or precipitation is to charge mobile particles with an electrical polarity opposite that of a conducting collector electrode to which the mobile particles are therefore attracted by the well known electrostatic forces of attraction between opposite electrical charges.

Many of the prior electrostatic lubrication attempts have generally tried to achieve this desired end by:
1. generating a supply of lubrication particles often of such large size that significant gravity forces influence particle movement and/or that application would result in local excesses of lubricant;
2. physically propelling the particles at a significant velocity through an ionization zone between two charged electrodes such that not all particles became charged or at least not all became uniformly charged;
3. physically propelling the thus hopefully charged particles towards a vertically moving metal strip or the like in an enclosed vertically rising metal housing (usually grounded to same potential as the metal strip) which may or may not include some electrical insulator therewithin in addition to an ambient air; and
4. providing a secondary upwardly directed air flow supply or depending upon so called "windage" effects, etc. to carry the still unattached hopefully charged particles vertically upward into an extensive deposition zone where "repeller" electrodes charged to the same polarity as the particles create an electrical field designed to force the particles (if charged) toward the metal strip.

Such prior apparatus has been characterized by its excessive height, its excessive weight and its inability to perform as anticipated in a practical manufacturing environment. The present invention has proven capable of very successful practical performance in an actual manufacturing environment. While all the reasons for this noted success may not yet be known or fully appreciated, it is presently believed that the following attributes of our invention are important in varying degrees to its noted improved performance:

1. method and apparatus is provided for forming substantially uniform liquid lubrication particles, the majority of which are uniformly sized to have an average diameter on the order of one micron to insure that the resulting mist cloud of particles (spheroids due to liquid surface tension) is completely airborne with resulting particle movements that are substantially independent of any gravity forces acting thereon;
2. a completely non-electrically conducting enclosure is provided to substantially eliminate any electrostatic forces tending to attract lubrication particles towards the enclosure walls rather than towards the conducting substrate as desired;
3. a charged plasma of ambient gaseous molecules is maintained within the non-conducting enclosure by impressing a high voltage difference between electrodes therein and the conductive substrate of metal rather than between two sets of electrodes;
4. the airborne mist cloud of spheroids is allowed to migrate or drift into the plasma area where multiple ion collisions charge the relatively larger spheroids in a relatively slow charging process which, as it approaches a steady state condition, will eventually impart substantially uniform maximum electrical charges on all the available uniformly sized spheroids which are thereafter uniformly attracted towards and uniformly dispersed upon the metal substrate;
5. since this process is substantially 100% efficient in steady state, the percentage coverage of the metal surface is determined primarily only by the quantity of spheroids supplied to the plasma and the rate of movement of the metal substrate (hence its dwell time within the non-conducting coating chamber);
6. the non-conducting coating chamber is divided into longitudinal sections to control the uniformity of coverage transversely across the metal substrate;
7. individually controllable particle generators are associated with each such longitudinal section and special transversely extending channel conduits are utilized for communicating between the particle generators and the coating chamber sections; and
8. complete lubricant film coverage of the metal substrate is not attempted but, rather, only a uniform dispersement of lubricant spheroids thereover;
9. many other features as will be apparent from the description hereinbelow.

There are, of course, still many further indications of difference between our invention and the prior electrostatic lubrication attempts as will occur to those in the art. For example, all known prior electrostatic lubrication application attempts have been constrained to apply same with the metal strip in a vertical orientation. It appears that such vertical orientation was considered necessary, inter alia, because it was necessary to use gravity forces to collect excess lubrication materials and to return same to the particle generator for reuse. However, with this invention, no special orientation of the metal strip is necessary. In fact, the present preferred exemplary embodiment described below happens to utilize a horizontal orientation of the metal substrate!

The presently known prior attempts at electrostatic application of lubricant materials to metal strips or sheets are described in the following prior issued U.S. Patents which were considered prior to filing this application:

U.S. Pat. No. 2,447,664 — Pegg (1948)
U.S. Pat. No. 2,710,589 — Brunner (1955)
U.S. Pat. No. 2,762,331 — Henderson (1956)
U.S. Pat. No. 2,764,508 — Feick (1956)
U.S. Pat. No. 2,994,618 — Landgraf (1961)
U.S. Pat. No. 3,726,701 — Nishikawa et al (1973)

There are of course other prior art patents relating generally to the electrostatic deposition of particles onto a metallic substrate (e.g. U.S. Pat. No. 3,155,545 — Rocks et al [1964] relating to electrostatic coating of dust particles to a metal pipe surface). However, the above-noted patents are believed to be more pertinent to the present invention.

Henderson discloses in U.S. Pat. No. 2,762,331 an apparatus for applying a film of lubricant onto a metallic sheet passing vertically through an enclosed metallic, grounded chamber having an internal layer of heat insulation. The atomized lubricant, together with an air flow, is passed into a manifold having a plurality of output holes therealong and sprayed upwardly into an electrostatic precipitation zone. The metallic sheet is apparently constrained to pass in a vertical direction so that relatively large droplets being sprayed from the manifold will fall under the force of gravity and be recovered. Henderson teaches that lubricants which are semi-solid at room temperature can be utilized provided they are sufficiently heated and the internal heat insulation of this chamber is apparently to insure that the lubricant is in liquid form when coated onto the metallic sheet.

Feick in U.S. Pat. No. 2,764,508 discloses an electrostatic lubricating apparatus which is somewhat similar to Henderson's since Feick utilizes an atomizer and a distributing manifold to spray lubricant particles upwardly onto a metallic sheet vertically passing through a closed metallic chamber. In order, however, to provide for a more uniform distribution of the liquid droplets from the atomized spray onto the sheet, Feick teaches forming the ionizing wire holder in the form of a loop on both sides of the metallic sheet passing through the enclosed chamber in an attempt to establish a more uniform electrostatic field. Feick also discloses the use of a lubricant, such as palm oil, which is normally semi-solid at room temperature and which is heated to about 160° F so that it can be readily atomized and directed in the form of a spray directly into an electrostatic precipitation zone.

The Rocks et al teaching in U.S. Pat. No. 3,155,545 is also directed to a direct spray electrostatic coating apparatus where dust particles are forced out of a first nozzle and air under pressure is forced out of a second nozzle proximate the first nozzle to disperse the particles forced out of the first nozzle in a direction toward an electrostatic deposition zone.

In such direct spray electrostatic precipitators, there is apparently a substantial amount of overspray which must be removed and either reclaimed or discarded. Some of the spray would also presumably be attracted to the surrounding metallic enclosure as well. In addition, such direct spraying techniques are believed to result in a nonuniformity of the application of the lubricant to the conductive material being coated as well as to present an inherent difficulty in precisely regulating the quantity of lubricant being deposited on the conductive material. Further, because there is no means for limiting the size of the particles, the larger lubricant particles do not acquire a sufficient charge to cause them to adhere to the metal and/or if they should happen to collide with the metal, they have a tendency to coalesce and run together thereby providing for a nonuniform coverage of the lubricant over the surface of the material being coated.

With respect to electrostatic precipitators wherein a cloud or mist is formed of particles to be deposited onto the surface of a vertically oriented conducting metallic strip, Brunner discloses in U.S. Pat. No. 2,710,589 an apparatus wherein a liquid lubricant is initially atomized in a first chamber to form a fog therein. The air causing the atomization of the lubricant forces the particles of lubricant through a zig-zag passageway to first eliminate large oil droplets from the oil spray before propelling the smaller oil droplets into a metallic electrostatic charging enclosure. After being relatively rapidly force through a charging zone, the hopefully ionized particles are then forced outwardly towards the vertically moving metallic sheet where a portion of the larger droplets fall downwardly into an oil recapturing reservoir. Because of the speed in which the droplets pass through the electrostatic charging enclosure, it is believed that a substantial portion of the droplets do not acquire a sufficient charge and accordingly do not adhere to the metallic strip and are forced upwardly by the "windage" of the moving strip between the strip and repeller or precipitation plates. The repeller plates generate a field which is supposed to result in moving the droplets toward the metallic strip. The Brunner apparatus appears to have a number of drawbacks including the fact that the liquid particles are not sufficiently charged to permit their adherency to the surface of the metal without the assistance of an auxiliary precipitation field. In addition, the larger particles which adhered to the metal before it passed into the precipitation field tended to coalesce on the metal to thereby form an uneven distribution of the lubricant over the surface of the metal. Further, the flexibility of the Brunner lubricator was limited because it had to be positioned so that metallic strips moved therethrough only in the vertical directions. This limited the capability of the lubricator to apply lubricants to individual sheets of metal because of the difficulty of conveying such sheets upwardly through the lubricator.

Subsequently, Landgraf disclosed in U.S. Pat. No. 2,994,618 an electrostatic coating apparatus wherein a mist or fog of liquid lubricant droplets were generated with the smaller droplets passing upward past a baffle into an ionization or particle charging zone. Within each charging chamber, there exists a turbulent electrostatic field surrounding the ionizing wires which tends to precipitate the oil mist onto the walls of the chamber, from whence the material refluxes back into a fog chamber. Accordingly, a second supply of air was coupled to the fog chamber which forced increased quantities of the lubricant droplets upwardly into a metallically enshrouded charging zone and forced the particles being charged upwardly into a precipitating zone before they precipitated into the walls of the ionization chamber. Apparently, because of the speed of movement of the particles through the ionization chamber caused by the secondary supply of air, the particles received insufficient charge to directly adhere to the metallic sheet being lubricated, thus the precipitation zone was required in which a field was generated for assisting in directing the droplets onto the sheet. By varying the quantity of air forced into the fog chamber, the relative quantity of lubricant deposited on the conductive material passing through the precipitator could be controlled. This apparatus suffered from the same drawbacks as the aforementioned Brunner apparatus since the liquid droplets are not sufficiently charged to permit their adherency to the surface of the metal without the assistance of an auxiliary precipitation field. In addition, the larger particles which adhered to the metal before it passed into the precipitation field tended to coalesce on the metal to thereby form an uneven distribution of the lubricant over the surface of the metal. Further, the flexibility of the Brunner lubricator was limited because it had to be positioned so that metallic strips moved therethrough only in the vertical direction. This limited the capability of the lubricator to apply lubricants to individual sheets of metal because of the difficulty of conveying such sheets upwardly through the lubricator and the wind currents which pushed the charged lubricant droplets up into the precipitating zone caused a non-uniformity in the deposition of the particles onto the material being coated.

More recently, Nishikawa et al disclosed in U.S. Pat. No. 3,726,701 an electrostatic coating apparatus of similar design to the Landgraf apparatus but which further controlled the quantity of lubricant applied to the conductive material vertically passing through a metallically enshrouded precipitator by varying the electrostatic charge applied to the lubricant droplets as well as the air flow which forced the droplets from a cloud or mist chamber through the ionization chamber and into the precipitation zone. Thus, the Nishikawa et al precipitator also forces the droplets into the precipitation zone by a fast air flow and the droplets are prevented from acquiring sufficient charge to prevent them from coalescing on the metallic strip to thereby form a non-uniform application on the sheet or material being lubricated.

Pegg discloses in U.S. Pat. No. 2,447,664 a metallically enshrouded vertical electrostatic coating apparatus wherein a liquid spray is directed into ionizing and coating zones. A complex arrangement of blowers and shutters was provided to attempt to force movements of the lubricating spray and to more uniformly apply the lubricant in the form of a film onto a material passing vertically through the precipitation zone. While the Pegg apparatus may have overcome some problems of non-uniform distribution of a spray onto a sheet being lubricated to a certain extent, the system utilized was quite complex. Further, as aforementioned, the use of a liquid spray is inherently difficult to control and accordingly, the application of a film of lubricant to the sheet passing through the Pegg apparatus would presumably have a tendency to be non-uniform in thickness. Finally, Pegg required the use of electrostatic repelling plates to achieve his coating which added to the expense of the Pegg precipitator.

In summary, none of the prior known attempts to lubricate a moving metal strip, sheet or the like using electrostatic precipitation are believed to have actually achieved a uniform substantially random dispersion of minute lubricant particles to conductive substrates in a practical highly efficient manner in actual production line environments. Nor have any of the prior attempts provided precipitating apparatus for this purpose of such simple and economical design as that to be described herein.

It therefore is an an object of this invention to provide an improved method and apparatus for applying lubricating material uniformly and efficiently onto a metallic substrate such as sheets, strips, etc.

Accordingly, this invention relates to a method and apparatus for uniformly electrostatically dispersing lubrication particles onto a conductive substrate. In the exemplary embodiment, a lubricant, which is preferably solid at room temperature, is heated to form a liquid. The liquid lubricant is then sheared within an air fed orifice into an airborne mist of droplets directed downwardly towards an underlying liquid supply. Larger droplets are filtered out of the air flow by gravity, baffles, air flow forces and inertia effects to leave only a mist cloud of extremely small, substantially uniformly sized, spheroid particles, the majority of which have average diameters on the order of one micron and which are substantially independent of gravity forces. This mist cloud is then migrated or drifted toward a longitudinally partitioned enclosure and preferably a non-electrically conducting enclosure having a plurality of electrodes therein. Corona discharge from the electrodes produced by a voltage difference maintained between the electrodes and the metal substrate causes the atmosphere within the enclosure to, in effect, become a plasma of ions, i.e. charged molecules of the ambient gases. The mist or cloud of lubricating spheres is introduced into the plasma as a migrating sheet cloud permitting each particle to randomly move and collide with ions in the plasma thus acquiring a charge from the relatively smaller ions. Due to the relatively slow random movement and the uniformly small size of particles, they will all eventually acquire a substantially uniform maximum electrical charge giving rise to electrostatic forces which uniformly disperse the particles onto the conducting substrate passing through the partitioned non-conducting chamber to form a uniform, substantially random distribution of lubricating spheres over at least one surface of the conductive substrate. In the preferred embodiment, the lubricant spheroids become frozen to a solid state before being dispersed onto the metallic surface. Uniformity of distribution of the spheres on the conductive substrate is insured because the particles are uniformly small and permitted to rather slowly migrate about the non-conducting chamber long enough to acquire uniform maximum electrical charges sufficient to strongly adhere same to the conductive substrate while at the same time repelling one another to thereby prevent coalescing of the particles. Further, the longitudinal partitioning of the non-conductive enclosure inhibits non-random movement of the spheres with respect to the plane of the conductive substrate. Since this process is substantially 100% efficient, the percentage coverage of the tiny lubricating spheres on the conducting substrate is dependent only upon the quantity of particles supplied to the chamber and the relative velocity of the substrate (hence its dwell time in the enclosure).

Other objects, features and advantages of the present invention will become more fully apparent from the following detailed description of the preferred embodiment, the appended claims and the accompanying drawings in which:

FIG. 1 is a side elevation view of presently preferred exemplary embodiment of the present invention;

FIG. 2 is a plan view of the preferred exemplary lubricating apparatus illustrated in FIG. 1 shown in partial section;

FIG. 5 is a section view of the lower mist forming exemplary apparatus of the present invention;

FIG. 6 is a partial plan view of the exemplary mist forming apparatus illustrated in FIG. 5;

Figure 10:
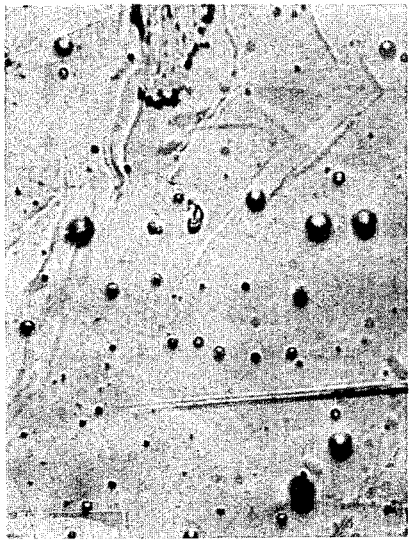
Figure 11:
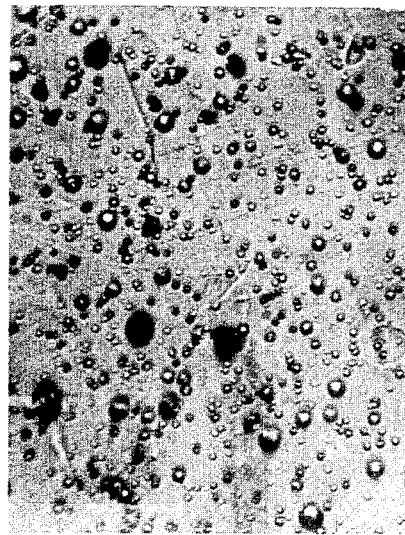

FIG. 10 is a photo showing the density and substantially uniform distribution of solid spheres of lubricant onto a tin plate conductive substrate formed while the tin plate was moving through the lubricating apparatus at 300 feet per minute and when 50 cubic feet per hour of air is introduced into the mist generators of the apparatus of FIG. 1 to produce the mist cloud that is slowly migrated into the non-conducting precipitation enclosure; and FIG. 11 is a photo showing solid spheres of lubricant deposited on a tin plate while the plate was moved through the lubricating apparatus at 45 feet per minute and when 50 cubic feet per hour of air was being introduced into the mist generators of the FIG. 1 embodiment.

Refer now to FIG. 1 which is a side elevation view of a presently preferred exemplary embodiment of the present invention. As illustrated, the lubricating apparatus includes a longitudinally partitioned, non-electrically conducting precipitation chamber 51 which preferably is formed of a plastic material such as polypropylene. The precipitation chamber 51 has an upper portion 53 which is above the plane 55 through which the conductive substrate passes and includes a lower portion 57 which is positioned below the plane 55. A plurality of transversely extending electrodes or wires 59 forming a grid on each side of the substrate are charged to a common potential with respect to the conductive substrate and are positioned transversely with respect to the direction of movement of the conductive substrate through the lubricator. The electrodes are spaced with respect to the conductive substrate by a suitable distance, e.g., three inches, on each side of the substrate and are spaced with respect to one another. An ac voltage is preferably superimposed across the length of individual wires 59 to heat the wires and thus prevent an accumulation of lubricant deposits on the wires. A schematic showing of such a heating arrangement may be seen in FIG. 9.

An upper mist generator 61 is illustrated which in the preferred embodiment is sectioned into a plurality of transversely aligned mist generating units, one associated with each partitioned chamber within the precipitation chamber 51. Each section of the mist generator 61 includes a reservoir 63 which contains the lubricant material to be dispersed onto the upper surface of the conductive substrate. Preferably, the lubricant is solid at room temperature and accordingly, a heating element 65 is positioned within the reservoir in order to heat the lubricant to a liquid state. As will be explained more fully hereinbelow, air or another suitable gas supply is coupled to a venturi atomizer 67 which is positioned in the upper portion of the mist generator. The passage of air under pressure into the venturi causes a pressure drop at the top of feedline 69, thereby causing the liquified lubricant to be sucked up into the venturi where the lubricant is sheared into individual droplets. The droplets then drop downwardly into the reservoir 63 where the larger droplets are returned to the bath of liquid lubricant. The remaining droplets in the mist migrate through a baffle filter arrangement (see FIG. 7) into the air flow outlet chamber in the upper portion of the mist generator and then through a channel 71 into the precipitation chamber 51. The baffle filters out relatively large particles so that only particles of sufficiently small size, e.g. on the order of 10 microns in diameter or less and the majority on the order of one micron migrate into the precipitation chamber. The migration of the tiny spherical particles is so slow that during this migrating process, the particles solidify and become dry and accordingly undertake the characteristics of hard, solid spheres. The particles enter the precipitation chamber 51 in the form of a cloud which is substantially uniformly distributed across the width of each longitudinally partitioned section or portion of the chamber.

A second series of transversely aligned mist generators 73 are positioned on the underside of the plane 55 along which the conductive substrate passes. The second set of mist generators each includes a reservoir 74 which contains the lubricant to be applied to the underside of the conductive substrate. A heater 75 is illustrated for maintaining the lubricant in its liquid state. A venturi atomizer 77 is positioned at the top of the reservoir and includes a venturi through which air under pressure passes. As the air under pressure passes through the venturi, the liquified lubricant is sucked up through feedline 79 and is sheared into droplets by the air passing through the throat of the venturi. The larger droplets fall back downwardly into the liquid bath while smaller particles not affected by gravity tend to flow through a zig-zag path 81 defined by a set of baffle filters into the lower portion 57 of the precipitation chamber 51. These particles migrate quite slowly into the precipitation chamber 57 and accordingly, because of the low heat capacity thereof, solidify in the case of the preferred lubricant which is a solid at room temperatures. Because of the migration of the particles into the chamber 57 and the small size of the particles, its particles each acquire a strong charge, i.e. a relatively large charge to mass ratio. Thus, the particles not only tend to be randomly dispersed before being charged but also are randomly and uniformly dispersed onto the conductive sheet passing through the chamber after being charged. Thus, a substantially uniform distribution of the solid spheres on the conductive substrate is achieved.

Air supply for shearing the liquid lubricant in the throats of the venturis 67 and 77 is coupled to the lubricator via an air filter 83. After the air has passed through the air filter 83, it passes through an air pressure regulating valve 85 and then into upper and lower air flow distributors 87 and 89, respectively. The air coupled to each of the flow distributors 87 and 89 is controlled by meter valves 91 and 93, respectively. Thus, for example, the total air flowing into air flow distributor 87 is controlled by meter valve 91. The air passing into the distributor 87 is coupled to each of six distributor conduits 95 via flow metering valves (not shown) of conventional design. Each of these conduits is coupled to an individual upper mist generator 61. In addition, the air flow coupled to the lower distributor 89 is controlled by meter valve 93 with the distributor 89 coupling air to each of a plurality of distributor conduits 99 via flow metering valves. Each of the flow metering valves is manually adjustable to control the air flow into the conduits 95 (not shown). The conduits 99 couple the air under pressure to each of the plurality of individual mist generators 73 positioned on the underside of the substrate which passes through the lubricator.

The conductive substrate is fed into the lubricator via a powered friction roller drive and is then passed along the plane 55 within the lubricator by means of a belt drive 129. The substrate is passed out the exit end 103 of the lubricator and onto an output friction roller drive. The substrate being lubricated may be in the form of individual sheets, a coil which is unravelled as it passes through the lubricator and is then wound up at the output end of the lubricator, an endless strip in a strip line manufacturing environment, or may be in any other suitable form as will be appreciated by those in the art. The lubricator itself is of relatively small size and, as illustrated, can be easily moved from place to place by retracting the supports 107 so that the lubricator is supported by the rollers 109. As shown to approximate scale in the drawings, the FIG. 1 lubricator has an overall width of about 68 inches, a height from the floor to the pass line of the sheet metal of about 45 inches and an overall length of about 8 feet, 2 inches.

In the case where no conductive sheets are being passed through the lubricator, a blower 111 positioned at the output end of the lubricator is activated and is coupled to an outlet chamber 113 which is positioned at the outlet end of chamber 51 about the upper and lower portion of the plane 55 through which the substrate passes. The blower collects and filters out of the ambient air the lubricating spheres which, of course, are not deposited on a substrate at such times since no substrate is then passing through the precipitation chamber 51. It should be understood, of course, that when a conductive substrate is passing through the precipitation chamber 51, substantially all of the particles are electrostatically dispersed onto the substrate and accordingly, the blower 111 is not activated when the lubricator is in normal operation.

Refer now to FIG. 2 which is a plan view of the lubricator of the present invention shown in partial cut-away. The precipitation chamber 51 formed of a suitable plastic material is shown divided or partitioned longitudinally into a plurality of sections or chambers by means of longitudinally extending partitions 52. The electrodes or corona discharge wires 59 are illustrated extending transversely with respect to the longitudinally oriented chambers. At the inlet end of the precipitation chamber are a plurality of mist generators 61, each one associated with an individual partition or chamber of the precipitation chamber 51. Each mist generator is illustrated (see FIG. 3) having a separate air flow distributor conduit 95 coupled thereto for supplying air to its respectively associated venturi atomizer 67 and for forcing the sheared lubricant droplets downwardly into the reservoir 63 positioned therebelow. In the preferred embodiment, each mist generator actually has four controllable venturi atomizers 115–118 to which the air from the conduit 95 is coupled. Each venturi, as will be seen hereinbelow, generates fine lubricating spheres which are migrated into the precipitation chamber 51. By having the precipitation chamber 51 partitioned as illustrated, swirling of the air and lubricating particles from one side of the chamber to the other is prevented and accordingly, a random uniform distribution of the lubricating spheres on the conductive substrate is insured. Further, because the entire chamber housing is non-conductive, the charged lubricant particles move freely within the chamber without becoming attracted to the housing. Because of this the particles within the chamber continue to acquire charge until the particles acquire sufficient charge to become accelerated toward the substrate.

At the input side of the lubricator the conductive substrate is fed into the precipitation chamber 51 via friction rollers 121 which are driven by a motor 119 via a chain drive assembly 123. At the outlet side of the lubricator, a second set of friction drive rollers 125 driven by motor 127 pulls the conductive substrate away from the lubricator. Preferably, the friction rollers 125 are driven at a faster rate than the input friction rollers 121 in order to give the substrates passing through the lubricator added momentum for ease of stackability in the case where individual sheets of metal are being lubricated. As the conductive substrate passes through the lubricator and particularly through the precipitation chamber 51, the substrate is supported and guided by means of a plurality of belts 129 which are driven by the motor 127 via a chain drive assembly 131. Each of the belts 129 is relatively thin so that only a small portion of the total surface of the conductive substrate passing through the lubricator will be contacted by the belts 129 and accordingly, only a small portion of the total surface area of the substrate will not have a lubricant dispersed thereon.

Figure 4:
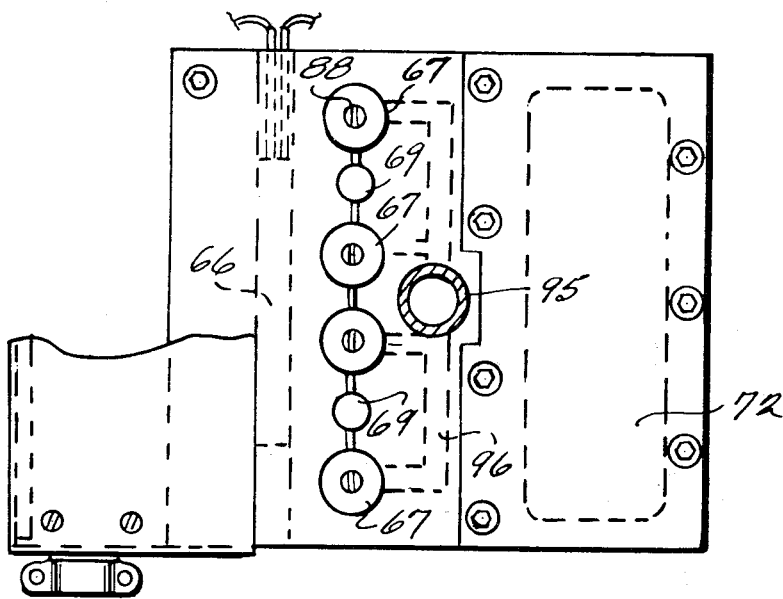
FIG. 4 is a partial plan view of the upper mist forming exemplary apparatus illustrated in FIG. 3.
Figure 3:
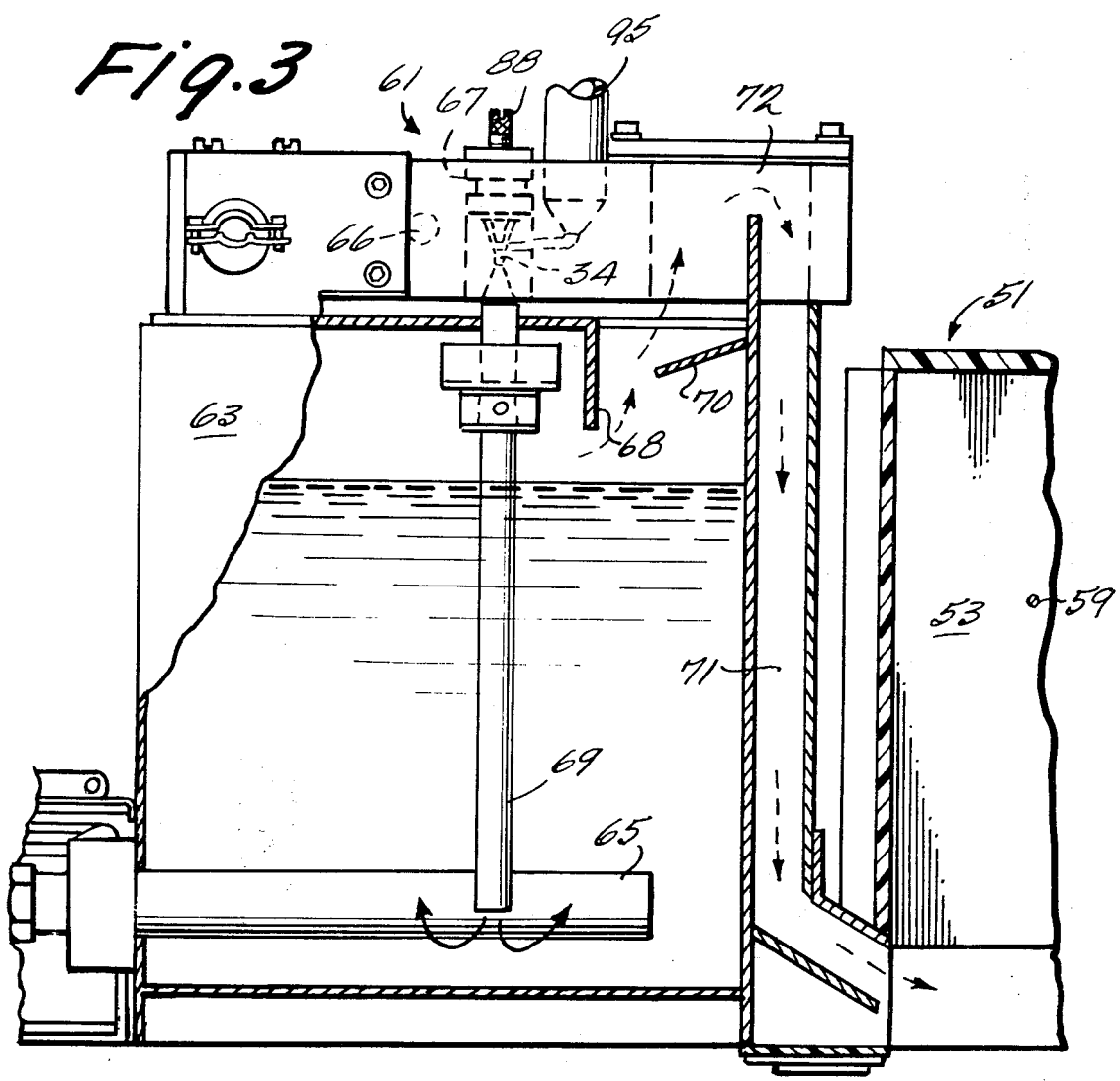
FIG. 3 is an elevation view shown in partial section of the upper mist forming exemplary apparatus of the present invention.

Refer now to FIGS. 3 and 4 which illustrate in greater detail the individual upper mist generators 61 illustrated in FIGS. 1 and 2. With specific reference to FIG. 3, the individual mist generators each include a reservoir portion 63 at the bottom thereof. The reservoir contains a lubricant which preferably is a solid at room temperature. Accordingly, a heater 65 of conventional design is positioned within the reservoir 63 proximate the bottom thereof. The heat generator is appropriately energized in a conventional manner to maintain the lubricant in a liquid state during operation of the lubricator. At the top of the reservoir is positioned a plurality of venturi atomizers 67. Air or any other suitable gas under pressure is coupled to each of the venturi atomizers from the associated distributor conduit 95 via distributor passages 96. In addition, a plurality of feed lines 69 are provided through which the liquefied lubricant is drawn upwardly and into the venturi atomizers. In the preferred embodiment there are four venturi atomizers and two feed lines in each mist generator with each feed line supplying liquid lubricant to two of the venturi atomizers as illustrated in FIG. 4. The venturi atomizers may be of conventional design but preferably are of the same design as the venturi atomizer illustrated in the above referenced commonly assigned copending application of Messrs. Scholes and Dollar. A coarse air flow control 88 is provided for each venturi atomizer for shutting off the air flow therethrough if desired. As aforementioned, the lubricant is preferably solid at room temperature and accordingly, a heating element 66 is provided in the upper portion 65 of the mist generator 61 in order to maintain the lubricant in a liquified state as it passes upwardly through the feed line 69 and into the venturi atomizer.

The exemplary venturi atomizer air passage or orifice has a diameter on the order of 0.05 inch and accordingly, even though the relative volume of air flowing into the mist generator 61 is small, the velocity of the air passing through the nozzle and into the throat of the venturi atomizer is quite high. Hence, the pressure at the throat of the venturi nozzle is sufficiently reduced to draw upwardly in the feed line 69 a sufficient amount of lubricant to cause a continuous shearing of the lubricant into fine droplets. For larger size venturis it may be desirable to actually force pump liquid lubricant to the orifice to obtain an increased production quantity of particles therefrom. The droplets are then forced downwardly into the reservoir 63 under the force of the air flowing through the throat of the venturi and under the force of gravity. The larger droplets which are still in the liquified state drop into the bath of lubricant in the reservoir while finer droplets having a diameter on the order to 20 microns or less and preferably much less than 10 microns form a cloud or mist of particles in the upper portion of the reservoir 63. These fine droplets migrate about a first baffle 68 and a second baffle 70 into an air flow outlet box 72 positioned in the upper portion 65 of the mist generator. The baffles 68 and 70 tend to disperse the air flow and the fine lubricating droplets so that their distribution across the width of the mist generator is substantially uniform and random in nature. In addition the baffles 68 and 70 filter out relatively large droplets which having a greater momentum than smaller particles can not negotiate the tortuous path through the baffles and instead strike the baffles and fall back into the bath. The fine small diameter droplets which pass upwardly into the box 72 have such a small size that they move upwardly substantially independently of the force of gravity. Applicants have found that only about 5 to 10% of the droplets formed by the venturi atomizers 67 have sufficiently small size to migrate upwardly past the baffles and into the box 72 with the remaining droplets falling back into the liquid lubricant bath. After the particles have moved into the box 72, they migrate downwardly through passage 71 which exits into the upper portion 53 of the precipitation chamber 51. The droplets as they migrate through passage 71 are still substantially in liquid form. However, in the case of the preferred lubricant which is solid at room temperature, because of their low heat capacity, as they pass into the precipitation chamber the droplets solidify and dry, thereby taking on the characteristics of round, solid bearings. The droplets pass into the chamber 51 and form therein a cloud of randomly dispersed lubricating spheres which are not attracted to the metal substrate passing therethrough until the droplets acquire a sufficiently great charge. The migration of the cloud of lubricating spheres into the chamber 51 is assisted by the relatively low volume air flow passing through the venturi 67 and into the upper portion of the reservoir 63. As aforementioned, the electrodes or corona discharge wires 59 positioned within the chamber 51 ionize the atmosphere therein due to a voltage maintained between the electrodes and the metal substrate, thereby creating a plasma of ionized ambient gaseous molecules about the electrodes 59. This ionized atmosphere in turn multiply collides with and thus imparts a substantially uniform maximum charge to the fine but relatively larger spherical lubricating particles migrating into the chamber to thereby cause the charged lubricating particles to be attracted to and uniformly and randomly dispersed unto the conductive substrate passing therethrough.

Refer now to FIGS. 5 and 6 which illustrate one of the mist generators positioned on the underside of the conductive substrate passing through the lubricator. As illustrated, the lower mist generators each includes a reservoir 74 which contains a lubricant which is liquified by means of a heating element 75 of conventional design. Positioned above the reservoir 74 is a mist forming portion 78 having a plurality of venturi atomizers 77 positioned therein. Air under pressure is coupled to each of the venturi atomizers 77 via distributor conduit 99 as illustrated in FIG. 6. In addition, a pair of feed lines 79 are provided which extend downwardly into the bath of lubricant at one end and which are coupled to a passageway leading to the throat of two venturi associated therewith at the other end. A second heating element 80 is positioned within the upper portion of the mist generator for maintaining the lubricant in a liquid state as it passes into and out of the venturi atomizer 77.

In operation as air under pressure is forced into the throats of the venturi atomizers, lubricant is drawn upwardly through the feed lines 79 and into each of the venturi atomizers. The lubricant is then sheared into droplets which are forced downwardly into the upper portion of the reservoir 74 by the force of the air acting thereagainst and under the force of gravity. The larger droplets which typically constitute 90 to 95% of the total droplets formed, drop back into the bath of lubricant while the remaining droplets, preferably having a diameter of less than 10 microns, migrate past baffle 82 and about a second baffle 84 into a passageway 86. The baffles 82 and 84 cause the droplets to become randomly distributed across the width of the mist generator and at the same time reduces the speed of movement of the droplets as they move out of the reservoir 74. In addition, the baffles filter the larger particles out of the mist to thereby reduce the average size of the particles migrating into the chamber 51. The passage 86 has a large exit area in order to further reduce the speed of the droplets so that as the droplets enter the lower portion 57 of the precipitation chamber 51, the movement thereof is migratory in nature with the droplets forming a slow moving cloud of randomly dispersed solid spheres of lubricant. These small dry spheres of lubricant are subsequently ionized and randomly dispersed onto the substrate moving through the precipitation chamber.

A coarse control 88 is provided for controlling the air flow through the throat of each of the venturi atomizers 77. Thus, for example, if it is desired to shut off one or more of the atomizers, a simple turning of the control 88 will shut off the flow of air through the venturi. This control is provided in addition to a fine control for each individual mist generator. It is contemplated that these and/or similar controls will be either manually or automatically manipulated to control the air supply, i.e., pressure or volume metering, etc., to the orifices and/or the number of such orifices in operation to thereby control the quantity of lubricating spheroids produced per unit time and delivered to the coating chamber.

Figure 7:
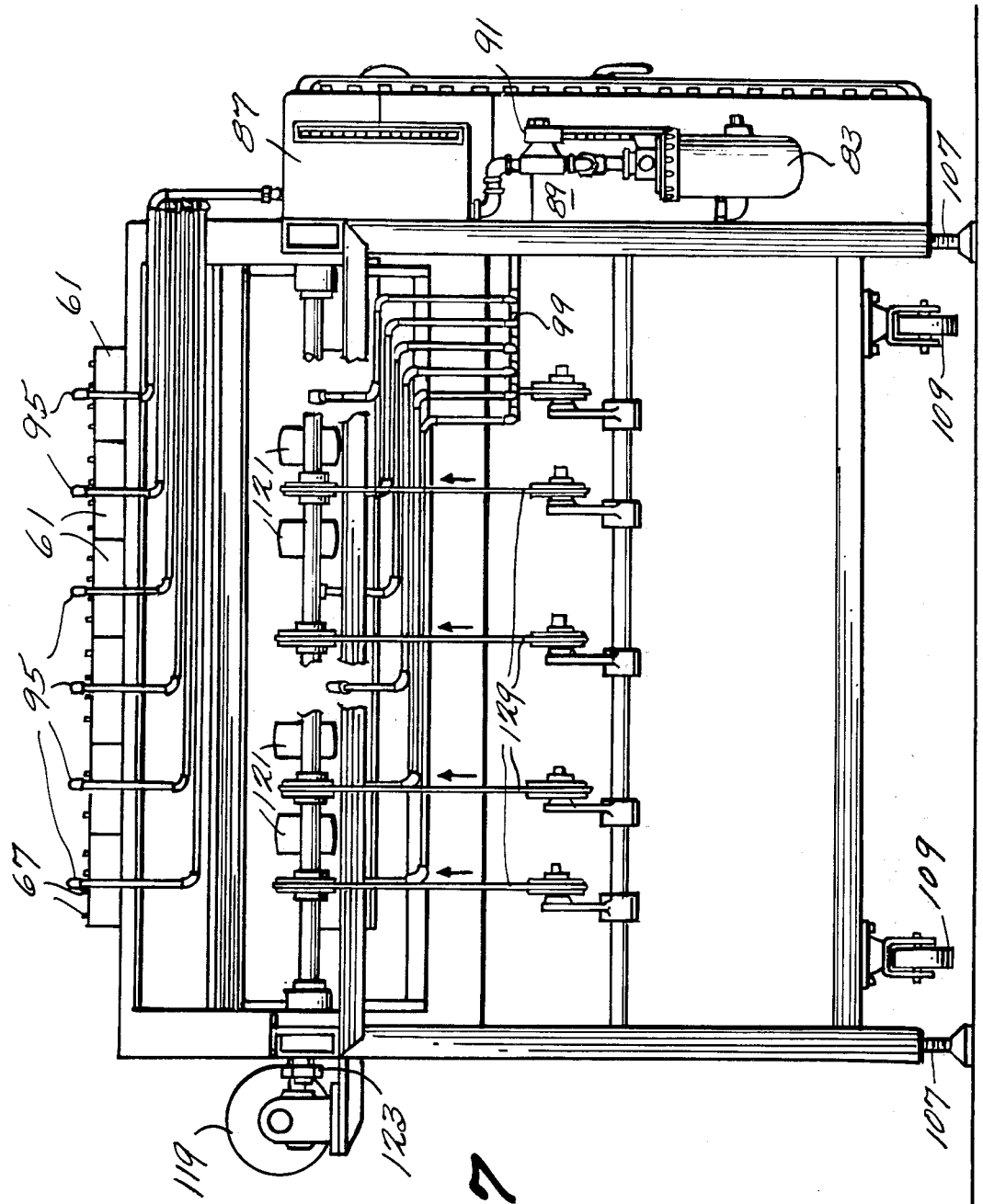
FIG. 7 is an entrance end view of the lubricating apparatus of the preferred exemplary embodiment of the present invention.

Refer now to FIG. 7 which is a view of the entrance end of the lubricator of the present invention. As illustrated, a motor 119 is fixedly secured to the side of the lubricator and drives a plurality of friction rollers 121 via a chain drive system 123. The friction rollers 123 pull the conductive substrate into the lubricator for applying the solid lubricating particles to the surfaces thereof. A belt drive arrangement is provided having a plurality of belts 129 which are driven by the motor 127 at the opposite end of the lubricator. Thus, the belts 129 support the conductive substrate as it passes through the lubricator and in addition assist in conveying the substrate as it passes through the precipitation chamber 51. The belts each pass under the lubricator and then upwardly in the direction illustrated by the arrows and then into and through the precipitation chamber 51. At the top of the lubricator is positioned a plurality of individual mist generators positioned alongside one another for generating the tiny solid spherical droplets which are dispersed onto the conductive substrate. A plurality of distributor conduits 95 conduct air under pressure from a distributor box 87 to each of the individual mist generators 61. The air flow into the distributor box 87 is controlled by means of a meter valve 91. The air filter 83 for filtering the air coupled to each of the venturi atomizers is also illustrated.

Figure 8:
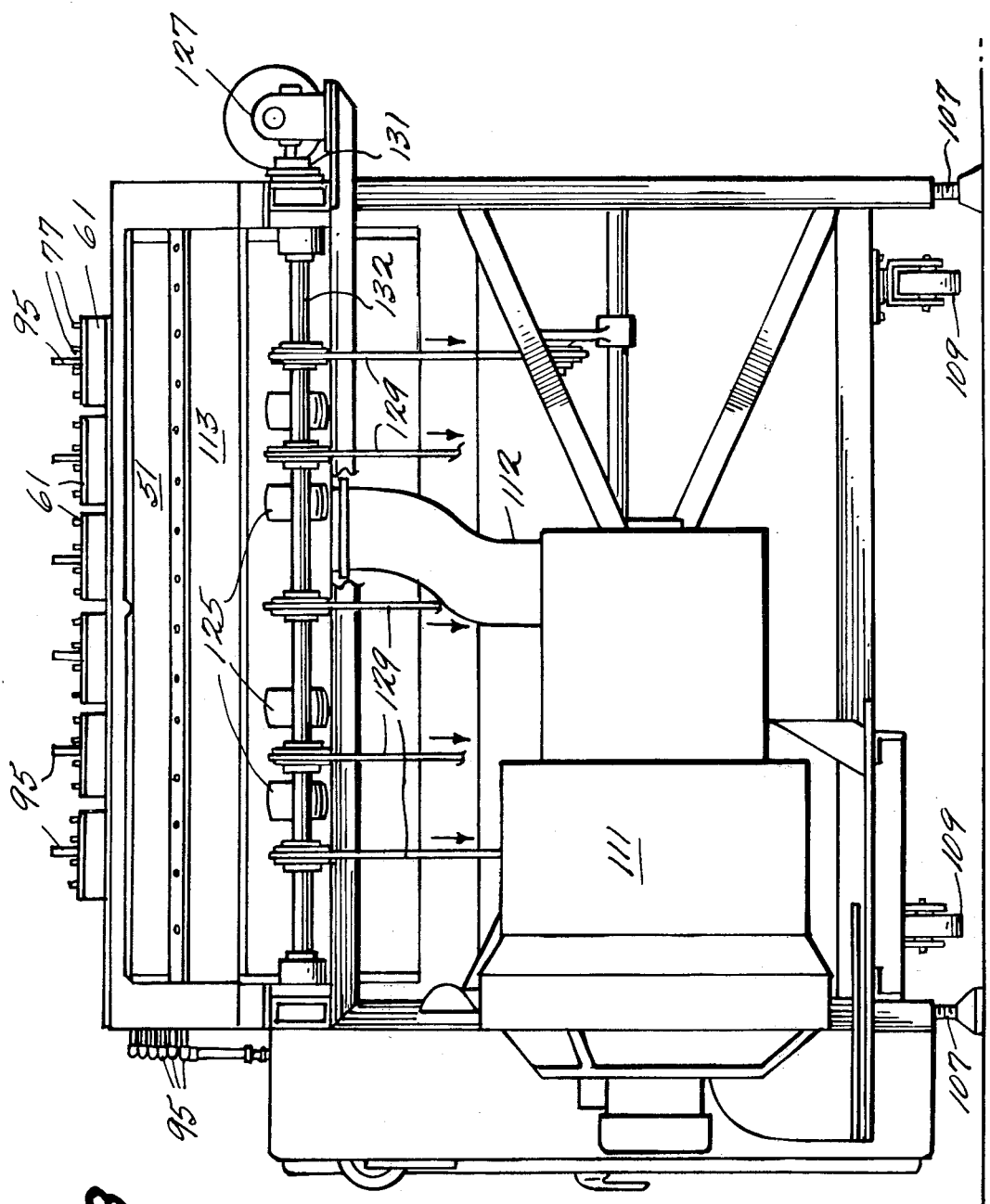
FIG. 8 is the exit end view of the lubricating apparatus of the preferred exemplary embodiment of the present invention.

Refer now to FIG. 8 which is an exit end view of the lubricator of the present invention. As illustrated, a motor 127 drives a plurality of friction rollers 125 which pull the metal substrate out of the precipitation chamber 51. In addition, motor 127 drives a plurality of drive belts 129 via a chain drive assembly 131 and an axle 132. The drive belts pass outwardly from the precipitation chamber 51 and downwardly as illustrated by the arrows and then under the lubricator to the front end thereof as illustrated in FIG. 7. As aforementioned, these belts guide the conductive substrate through the precipitation chamber.

Additionally, in case no conductive substrate is being passed through the lubricator, the lubricating spheres passing into the precipitation chamber 51 will not be attracted to any surface because of the non-conducting makeup of the precipitation chamber 51. Accordingly, a blower 111 is provided for drawing the spherical lubricating particles out of the chamber 51 through an exhaust conduit 112 and into an appropriate recovery vessel. It should be understood that the blower 111 is not used when a conductive subsrate is being passed through the precipitation chamber 51 since substantially all of the fine spherical particles of lubricant formed are randomly dispersed onto the substrate as it passes therethrough. Accordingly, such a blower is not required during normal operation of the lubricator.

Figure 9:
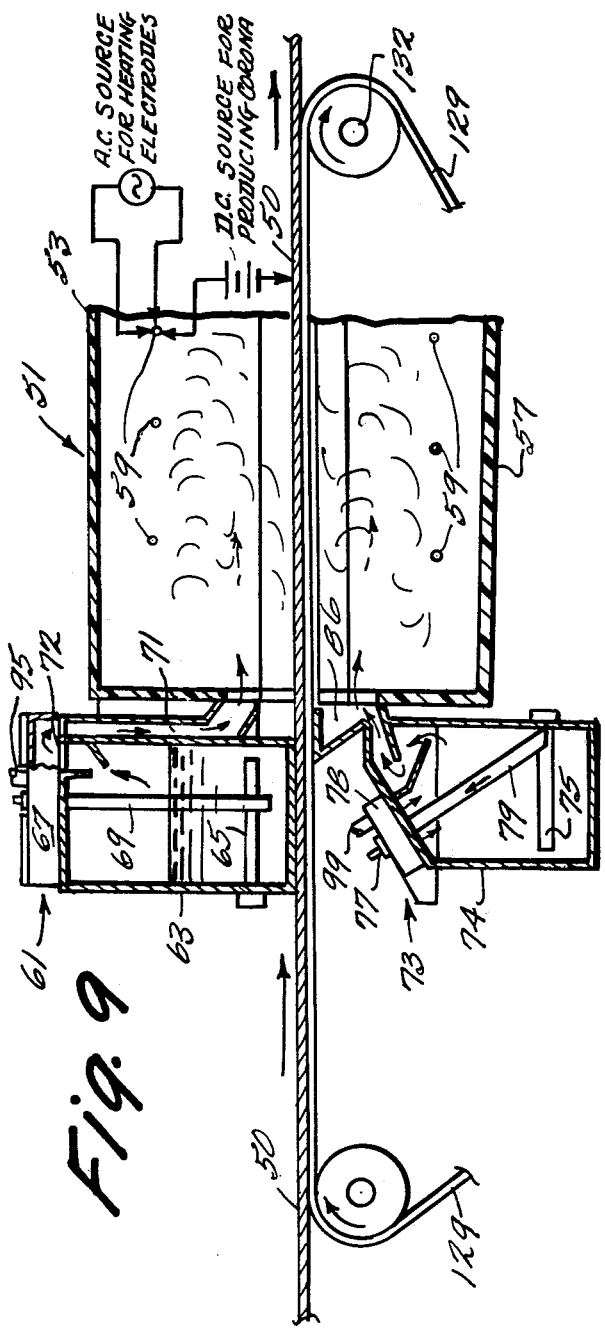
FIG. 9 is a schematic illustration of the exemplary process of applying fine particles of lubricant to a conductive substrate.

The operation of the lubricator of the present invention will now be described in conjunction with FIG. 9 which is a simplified schematic illustration of a portion of the lubricating apparatus of the present invention. A conductive substrate 50, which may be of any suitable material such as, for example, aluminum, iron, steel, copper, tin and various alloys thereof, is guided through the lubricator and in particular the precipitation chamber 51 by means of a plurality of belts 129 spaced across the width of the lubricator. The substrate is passed through the lubricator at any appropriate speed such as, for example, 45 feet per minute upwards to 300 feet per minute or more. As the substrate passes into the precipitation chamber 51, the slot therethrough for receiving the belts 129 and the substrate 50 is relatively small in order to contain the desired spherical particles of lubricant substantially totally within the precipitation chamber 51. At the same time as the substrate is moving through the lubricator, air under pressure is coupled to each of the distributor conduits 95 and 99 associated with the upper and lower mist generators 61 and 73, respectively. The pressurized air is then conducted through the venturi atomizers 67 in the upper mist generators which in turn causes liquid or liquified lubricant to be drawn upward into feed lines 69 and into the throats of the venturi 67. The resulting droplets thus formed are forced downwardly into the upper portion of the reservoirs 63 with the great majority of the droplets falling back into the lubricant bath. However, a small portion of the droplets, on the order of 5 to 10% thereof, migrate past a baffle filter arrangement including baffles 68 and 70 (see FIG. 3) and upwardly into an outlet air flow box 72 positioned in the upper portion of the mist generator. The baffles act as a filter which eliminates the relatively large droplets but which permits passage of the relatively small droplets into the box 72. In addition, the baffles and the air flow outlet box 72 slow down the movement of the tiny particles of lubricant and cause the particles to be uniformly and randomly distributed across the width of the mist generator. The mist then passes from the outlet box 72 into a passage 71 with the droplets still being substantially in liquid form. As the droplets migrate into the chamber 53 above the substrate 50, the droplets, if solid at room temperature, solidify into tiny hard spherical lubricant particles having diameters which range between 1 micron and 10 microns (most may be on the order of one micron) and which slowly move into and about the chamber 53 to form a cloud of particles substantially uniformly spread across the width of each partition chamber within the upper portion of the precipitation chamber 51.

At the same time, the grid of interconnected electrodes is appropriately charged with respect to the substrate so that a sufficient corona current is provided to ionize the surrounding atmosphere and to overcome space charge effects which might be imposed by the relative concentration of the particles passing into the chamber and any previously implanted coating on the substrate. The charging of the atmosphere surrounding the electrodes 59 results in the formation of a plasma which in turn multiply collides with and charges the relatively larger lubricant particles as within the chamber. The particles continue to randomly migrate about the chamber as they continue to acquire charge. When the particles are sufficiently charged, i.e., the particles have a relatively large maximum charge to mass ratio, they are attracted to the surface of the substrate 50 and are dispersed thereon in substantially a uniform random distribution. Because the particles are small and hence have little momemtum, they tend to repell one another as they move within the chamber. Accordingly, coalescing of the particles does not occur and the particles tend to be spaced from one another after being attracted to the substrate. This insures a substantially random distribution of particles on the substrate.

In the underside of the substrate 50 is a second series of mist generators 73 which, as aforementioned, generate a plurality of lubricant droplets, the great majority of which drop back into the lubricant back in the reservoir 74. However, those droplets of lubricant which have sufficiently small size, that is, a diameter ranging between 1 micron and 10 microns (most on the order of one micron) are not affected by gravity and have a tendency to migrate about the filter baffles 82 and 84 (see FIG. 5) and into an outlet chamber 86 which is of sufficiently large size to slow down the movement of the particles while the baffles 82 and 84 cause the particles to become randomly distributed across the width of the mist generator. The resulting cloud of spherical lubricant particles migrating into the lower portion 57 of the precipitation chamber 51 form a cloud of particles which are substantially uniformly distributed across the transverse width of each of the partition chambers within the precipitation chamber 51. These particles, after collisions with the plasma created by the electrode grid 59 become charged to the same polarity as the grid in the upper portion 53 of the chamber and thus cause the spheroids to be attracted to the substrate 50. The particles are dispersed randomly and uniformly across the width of the substrate 50 as it passes through the precipitation chamber 51.

With reference to FIG. 10, a photograph is shown of a portion of a substrate after having the solid lubricant spheres dispersed thereon with the portion of the substrate photographed magnified 1000 times. As can be seen, the solid droplets are randomly distributed over the surface of the substrate and have not coalesced together particularly because of the like charge each particle acquires as it is attracted to the substrate 50. The substrate illustrated in the photograph is a tin plate which was passed through the precipitation chamber 51 at 300 feet per minute. In addition, 50 cubic feet per hour of mist-producing air was passed into each of the mist generators and consequently into the precipitation chamber 51.

FIG. 11 is a photograph of a portion of a tin substrate surface magnified 1000 times illustrating the solid, dry, spherical lubricant particles substantially randomly distributed thereacross. To obtain the article of manufacture shown in this photograph, the tin substrate was moved through the precipitation chamber 51 at only 45 feet per minute as opposed to the 300 feet per minute rate used for the photograph of FIG. 10. Accordingly, the distribution of the solid spheres on the surface of the substrate is substantially denser. However, in each case it is noted that no coalescing of the particles occurs and that the particles are substantially randomly and uniformly distributed over the surface area photographed. The small particles illustrated (the majority of all particles) are on the order of 1 micron in diameter while it is estimated that the few largest particles shown have a diameter on the order of 4 or 5 microns.

While the number of particles per unit area dispersed onto the surface of the substrate is dependent primarily only upon the number of fine solid particles migrating into the chamber 51 and the relative velocity (and hence dwell time) of the substrate through the precipitation chamber, it should also be understood that the percent of the substrate area covered is also related to the size of the particles and/or to the weight in milligrams of the particles deposited on a unit area of the subtrate. Thus for the same given weight of lubricant deposited on a unit area of the substrate, particles having a diameter of one micron will cover twice the area of particles having a diameter of two microns and four times the area covered by particles having a diameter of four microns, and so on. Accordingly, it can be seen that by reducing the size of the solid particles deposited on the substrate, substantial quantities of lubricant can be conserved for a given desired percentage coverage of the substrate. This is an additional reason why the size of the spherical droplets is controlled by the baffles in the mist generators and by the design of the venturi atomizer so that only the very tiny particles having a diameter of less than ten microns and the majority being on the order of one micron are permitted to pass into the precipitation chamber 51.

In the above described preferred FIG. 1 embodiment it has been observed that mean lubricating particle velocities within chamber 51 are only on the order of 0.5 feet per second. Furthermore, with line speeds on the order of 300 feet per minute, controlled dispersions of lubricating particles on the order of 4–24 milligrams per square foot ($\pm$ 20% tolerance) have been obtained by controlling the number of mist generator venturis in operation (control valves 88) and/or by controlling the quantity of particles generated by each venturi such as, for example, by controlling the air pressure and flow thereto. As should now be apparent, manual or automatic controls can be effected to increase lubrication generation to accommodate line speed changes of the moving substrate. Since there are locations in most production lines where a designed line speed is nominally maintained, it may only be necessary to increase particle generation in steps (e.g., by turning controls 88 "on" and "off"). Thus, for example, there could be four steps in all triggered automatically by a tachometer electrical signal proportional to line speed. It is believed that line speeds up to as much as 1,200 feet per minute can be accomodated with reduced weights of lubrication per unit area and/or increased variances from a nominal application rate. However, since the lubrication produced by the teachings of this invention are of increased uniformity of smaller sized particles, etc., it has been discovered that the percentage coverage or weight per unit area of lubrication on the substrate may be significantly reduced from what was in the past considered necessary for proper lubrication using other methods which produce a lubrication film rather than the dispersed spheroid coverage of this invention.

Since the lubricated metal product of this invention is often ultimately used as a food or beverage container, it is important that the applied lubricant not produce an "off-taste" in the food or beverage. In this regard, experience has shown that care must be taken not only with the type of lubricant being used but also with the metal or other components of the lubricator with which the lubricant comes into contact during the application process. In this regard, it is presently preferred that the metal portions of the mist generator (e.g., the venturi, etc.) be made of brass, steel and/or aluminum.

At the present time, 0.05 inch venturi orifices have been used with the air supplied thereto at 10–30 pounds per square inch pressure to obtain respectively corresponding air flows through each venturi on the order of about 0.8 – 1.4 cubic feet per minute.

As a nonlimiting exemplary description of air pressures, flow rates, coating efficiency, coating weight per unit area, percentage coverage etc., to be expected with the above described preferred exemplary embodiment of the invention, the following exemplary calculations are presented using parameters applicable to the exemplary embodiment:

Let:
$W1 = 0.5$ — this is an assigned value of 0.5 feet per second velocity of a charged particle moving toward the grounded metal surface.
$X = 4$ — the length of the chamber 51 in feet.
$D = 0.25$ — the spacing in feet of the electrode wires 59 from the metal surface.
$C = 0.8$ — constant chosen to represent orifice sharp edges.
$T1 = 530$ — absolute temperature (° F) of air.
Orifice Area = $\pi R^2$ — (0.052" diameter hole in venturi).
PSI = from 5 to 75 — pounds per square inch pressure delivered to venturi input.
$P1 = P + 14.7$ — pressure corrected to absolute.
$W$ = weight in pounds (per second) of air flowing through the 0.052" venturi orifice.

$V$ = volume of air in cubic feet per minute (CFM) calculated from its weight (one cubic foot of air at this temperature weighs 0.07494 pounds).

$V1$ = velocity of air through the chamber 51 (one sie). This is calculated using 54 venturis in a chamber 51 cross-section of 6 feet by 6 inches (3 ft$^2$).

$Z$ = an exponential expression for an electrostatic orecipitator efficiency, where: $W1$ is the "drift velocity" of the charged particles; $X$ is the length of the chamber in feet; $V1$ is the air velocity in feet per second through the chamber; and $D$ is the electrode-to-metal spacing in feet.
$N = 1\ \text{EXP}(Z)$ — this is the expression for efficiency where EXP (Z) is the fraction of material (wax in this case) remaining in the air after passing through the chamber 51.
$N*100$ = percent efficiency.
Where,
$W = .5303\ (A)\ (C)\ (P1/\sqrt{T1})$
$V = 60\ (W/.07494)$
$V1 = V(54/((60).3))$
$Z = -(W1 \cdot X)/(V1 \cdot D)$ Then, the following results:

| PSI | CFM | % EFFICIENCY |
|---|---|---|
| 5 | 0.61727 | 100 |
| 10 | 0.773937 | 100 |
| 15 | 0.930605 | 100 |
| 20 | 1.08727 | 100 |
| 25 | 1.24394 | 100 |
| 30 | 1.40061 | 100 |
| 35 | 1.55727 | 100 |
| 40 | 1.71394 | 100 |
| 45 | 1.87061 | 99.9999 |
| 50 | 2.02728 | 99.9998 |
| 55 | 1.18394 | 99.9995 |
| 60 | 2.34061 | 99.9989 |
| 65 | 2.49728 | 99.9977 |
| 70 | 2.65395 | 99.9957 |
| 75 | 2.81061 | 99.9924 |

As may be seen, this shows that lubricant entering the chamber 51, under the stated conditions of venturi pressure, would substantially all be deposited on the metal substrate regardless of the air pressure utilized.

It is also possible to calculate the number of lubricant spheres needed for a given weight per square foot, depending on sphere size and/or to calculate the percentage of the total area actually covered by the spheres for a given weight per unit area. For these exemplary calculations, let:

$S = 0.84$ the density of an exemplary wax lubricant
$B = 12$ inches converted to centimeters
$R$ = particle radii from 2 to 4 microns
$W$ = weight per square foot in milligrams N = total number of spheres of wax per square foot at a given weight by the weight of a single sphere, at a give size.

A = area covered by wax spheres, calculated by multiplying the total number of spheres by the area of one sphere ($\pi R^2$).

C = percentage coverage

Where:

$$N = w/((4/3) \cdot \pi \cdot R^3 \cdot S \cdot 10^3)$$

$$A = N \cdot \pi \cdot R^2$$

$$C = (A/B^2) \cdot 100$$

Then the following results:

| MICRONS DIA | MG/FT$^2$ | NUMBER OF SPHERES IN MILLIONS | PERCENT COVERAGE |
|---|---|---|---|
| 4. | 4 | 142 | 1.9 |
| 4. | 8 | 284 | 3.8 |
| 4. | 12 | 426 | 5.8 |
| 4. | 16 | 568 | 7.7 |
| 4. | 20 | 710 | 9.6 |
| 4. | 24 | 852 | 11.5 |
| 5. | 4 | 72 | 1.5 |
| 5. | 8 | 145 | 3.1 |
| 5. | 12 | 218 | 4.6 |
| 5. | 16 | 291 | 6.2 |
| 5. | 20 | 363 | 7.7 |
| 5. | 24 | 436 | 9.2 |
| 6. | 4 | 42 | 1.3 |
| 6. | 8 | 84 | 2.6 |
| 6. | 12 | 126 | 3.8 |
| 6. | 16 | 168 | 5.1 |
| 6. | 20 | 210 | 6.4 |
| 6. | 24 | 252 | 7.7 |
| 7. | 4 | 26 | 1.1 |
| 7. | 8 | 53 | 2.2 |
| 7. | 12 | 79 | 3.3 |
| 7. | 16 | 106 | 4.4 |
| 7. | 20 | 132 | 5.5 |
| 7. | 24 | 159 | 6.6 |
| 8. | 4 | 17 | 1 |
| 8. | 8 | 35 | 1.9 |
| 8. | 12 | 53 | 2.9 |
| 8. | 16 | 71 | 3.8 |
| 8. | 20 | 88 | 4.8 |
| 8. | 24 | 106 | 5.8 |

Even though only very low percentages of the substrate are actually covered by the lubricant, it has been discovered that this is nevertheless sufficient, for instance, for lubricating dies used to form shaped metal (e.g. cans) from the thusly lubricated metal substrate.

While the present invention has been disclosed in connection with only a single exemplary embodiment thereof, it should be understood by those in the art that there may be other variations of the preferred embodiment which fall within the spirit and scope of the appended claims.

What is claimed is:

1. Method for electrostatically and uniformly dispersing particles of lubricating material upon a moving length of electrically conductive substrate, said method comprising the steps of:

providing apparatus including a housing having transverse dimensions sufficient to encompass the transverse dimensions of said substrate, having a longitudinal dimension sufficient to encompass at least a predetermined portion of said moving length of substrate and having a predetermined depth over at least one side of the intended travel path of the substrate, said housing having ingress and egress openings which permit the conductive substrate to be moved therethrough along the longitudinal axis of said housing and having a plurality of longitudinal partitions disposed within said housing on said at least one side dividing the interior of this side of the housing into a plurality of longitudinally extending sections, and including electrodes disposed within said longitudinal sections of the housing and spaced from said intended travel path of the substrate;

impressing a voltage difference between said electrodes and said substrate as it passes through said housing so as to maintain a corona discharge and charged plasma atmosphere within said longitudinal sections while a substrate is passing therethrough; and supplying a predetermined quantity of particles of lubricating material to each longitudinal section.

2. Method as in claim 1 wherein said supplying step comprises:

supplying mists of lubricating material from a plurality of separately controllable mist generating sources, each respectively associated with one of said longitudinal sections.

3. Method as in claim 2 wherein a plurality of individually controllable gas-fed orifices are utilized in said supplying mists from separately controllable mist generating sources step for individually producing said particles of lubricating material from said orifices into the respectively corresponding longitudinal sections.

4. Method as in claim 2 wherein said supplying mists from a plurality of separately controllable mist generating sources step includes passing the mist of lubricating material through an output port on each such generating source connecting the source to its respectively associated longitudinal section via a conduit having at least one internal dimension substantially extending over the entire transverse dimension of at least its respectively associated longitudinal section.

5. Method as in claim 4 wherein each of said output ports has at least one internal dimension substantially extending over at least the transverse dimension of its respectively associated longitudinal section.

6. Method as in claim 5 wherein said step of supplying mists from a plurality of separately controllable mist generating sources comprises:

maintaining a liquid supply of said lubricating material within a substantially closed container in the lower portion thereof; supplying a stream of liquid to an orifice disposed in the top portion of said container having a controllable gas inlet and a gas outlet directed downwardly toward said liquid supply whereby particles of the liquid are sheared therefrom and propelled downwardly toward the underlying liquid supply; and passing the thus formed smaller sized particles of liquid through an opening disposed along one side of the container at an upper edge portion as said output port past a baffle means extending internally of said container along said output port so as to form an obstruction to undesired larger sized particles thereby tending to limit the size of particles carried through said output port.

7. Method as in claim 6 including:

passing the mist of particles from a first portion of said separately controllable mist generating sources while said sources are disposed in a transversely aligned bank along one end of said housing with the lower portion of the containers being disposed above the intended travel path of the substrate and wherein said conduit is a transversely and vertically extending channel connecting said output ports with a lower end portion of said at least one side of the housing adjacent one of the ingress and egress openings therein.

8. Method as in claim 1 wherein said housing is provided with an enclosed chamber within said housing having a predetermined depth over the remaining side of the intended travel path of the substrate opposite said at least one side; the interior of the remaining side of the housing being divided into a plurality of further longitudinally extending sections with a further plurality of longitudinal partitions disposed within said housing on said remaining side; and further electrodes also being connected to said voltage means and disposed within said further longitudinal sections of the housing and spaced from said intended travel path of the substrate; said method further comprising;

maintaining a corona discharge and charged plasma atmosphere within said further longitudinal sections while a substrate is passing therethrough; and supplying a predetermined quantity of particles of lubricating material to each further longitudinal section.

9. Method as in claim 8 wherein said supplying steps comprise:

supplying mists of lubricating material from a plurality of separately controllable mist generating sources, each respectively associated with one of said longitudinal sections and said further longitudinal sections.

10. Method as in claim 9 including supplying a liquid supply of said lubricating material to a plurality of individually controllable gas-fed orifices as each of said separately controllable mist generating sources for producing said particles of lubricating material.

11. Method as in claim 9 including passing the mist of lubricating material through an output port of each of said separately controllable mist generating sources connecting the source to its respectively associated longitudinal section or further longitudinal section via a conduit having at least one internal dimension substantially extending over the transverse dimension of at least its respectively associated longitudinal section whereby said particles are substantially uniformly supplied to each longitudinal section or further longitudinal section over its entire transverse dimension.

12. Method as in claim 11 wherein said steps of supplying separately controllable mist generating sources comprise:

maintaining a liquid supply of said lubricating material within a substantially closed container in the lower portion thereof; supplying a stream of the liquid to an orifice disposed in the top portion of said container having a controllable gas inlet and an gas outlet directed downwardly toward said liquid supply whereby particles of the liquid are sheared therefrom and propelled downwardly toward the underlying liquid supply;

passing the mist of smaller sized particles of liquid through an opening disposed along one side of the container at an upper edge portion as said output port past a baffle means extending internally of said container along said output port so as to form an obstruction to undesired larger sized particles thereby tending to limit the size of particles carried through said output port.

13. Method as in claim 12 including passing the mist from the separately controllable mist generating sources while such sources are disposed in a transversely aligned bank along one end of said housing with the lower portion of the containers being disposed above the intended travel path of the substrate and wherein said conduit comprises a transversely and downwardly extending channel connecting said output ports thereof with a lower end portion of said at least one side of the housing adjacent one of the ingress and egress openings therein; and passing the mist of particles from a second portion of said separately controllable mist generating sources while such sources are disposed in a transversely aligned bank along one end of said housing with the upper portion of the containers being disposed below the intended travel path of the substrate and wherein said conduit comprises a transversely extending channel connecting said output ports thereof with an upper end portion of said remaining side of the housing adjacent one of the ingress and egress openings therein.

14. Method as in claim 9 wherein the mist of lubricating material passing into each section is passed through an output port having at least one internal dimension substantially extending over at least the transverse dimension of its respectively associated longitudinal section or further longitudinal section.

15. Method as in claim 1 wherein said housing and said longitudinal partitions are formed of non-electrically conducting material.

16. Method for uniformly dispersing particles of lubricating material upon a moving electrically conductive substrate comprising:

dividing the lubricating material into a supply of small particles and into a plurality of clouds of such particles arranged across the width of the moving substrate by confining the small particles for random movement in such clouds; and electrostatically charging the randomly moving particles in each of the plurality of clouds by ionizing the atmosphere adjacent the electrically conductive substrate to deposit the small particles of lubricating material upon the substrate from the plurality of clouds substantially entirely under the influence of electrostatic force.

17. The method of claim 16 wherein a non-fluid lubricating material is dispersed and said step of dividing the lubricating material into a supply of small particles comprises the steps of heating the non-fluid lubricating material to liquefy it, atomizing the liquefied lubricating material into a spray including said particles, removing the larger particles from said spray and allowing the remaining small particles to return to their normal non-fluid state prior to being deposited upon the substrate.

18. The method of claim 17 wherein said step of atomizing the liquefied lubricating material includes releasing a flow of compressed air and subjecting the lubricating material to forces generated by the release of compressed air, and said step of removing the larger particles from said spray and allowing the remaining small particles to return to the normal non-fluid state includes using residual flow of the released compressed air to carry the spray over such a path that the larger particles are removed from the spray and the remaining particles are small enough to be substantially independent of gravity but subject to the residual flow of compressed air, such res6dual flow carrying the remaining small particles past baffling to distribute the smaller particles uniformaly within said plurality of clouds.

* * * * *